(12) United States Patent
Weber et al.

(10) Patent No.: US 10,347,287 B2
(45) Date of Patent: Jul. 9, 2019

(54) METHOD AND APPARATUS FOR REARRANGEMENT OF MEDIA DATA USING VISUAL REPRESENTATIONS OF THE SAME

(71) Applicant: THOMSON Licensing, Issy-les-Moulineaux (FR)

(72) Inventors: Michael Weber, Hannover (DE); Jens Brocke, Laatzen (DE); Stefan Kubsch, Hohnhorst (DE); Michael Pieper, Hannover (DE); Frank Glaeser, Hannover (DE); Hui Li, Hannover (DE)

(73) Assignee: INTERDIGITAL CE PATENT HOLDINGS, Paris (FR)

( * ) Notice: Subject to any disclaimer, the term of this patent is extended or adjusted under 35 U.S.C. 154(b) by 0 days.

(21) Appl. No.: 16/033,626

(22) Filed: Jul. 12, 2018

(65) Prior Publication Data

US 2018/0322906 A1 Nov. 8, 2018

Related U.S. Application Data

(63) Continuation of application No. 14/966,519, filed on Dec. 11, 2015, now Pat. No. 10,056,110.

(30) Foreign Application Priority Data

Dec. 12, 2014 (EP) .................................... 14307012

(51) Int. Cl.
*G11B 27/036* (2006.01)
*G11B 27/022* (2006.01)
(Continued)

(52) U.S. Cl.
CPC .......... *G11B 27/022* (2013.01); *G06F 3/0486* (2013.01); *G06F 3/04812* (2013.01);
(Continued)

(58) Field of Classification Search
CPC ....... G11B 27/036; G11B 27/19; G11B 27/28; G06F 16/48; G06F 17/241; H04N 21/23418; H04N 21/23424; H04N 21/84; H04N 21/854
See application file for complete search history.

(56) References Cited

U.S. PATENT DOCUMENTS 5,442,744 A 8/1995 Piech et al.
5,664,216 A 9/1997 Blumenau
(Continued)

FOREIGN PATENT DOCUMENTS

CA 2093313 12/2001
EP 2426665 3/2012
EP 2608059 6/2013

OTHER PUBLICATIONS

Min et al., "Video Contents Authoring System for Efficient Consumption on Portable Multimedia Device", Multimedia on Mobile Devices 2008, Proceedings of SPIE-IS&T Electronic Imaging, vol. 6821, 2008, pp. 1-12.

*Primary Examiner* — Mishawn N. Hunter
(74) *Attorney, Agent, or Firm* — Tutunjian & Bitetto, P.C.

(57) ABSTRACT

A method and an apparatus for rearrangement of media data using visual representations of the media data are described. A displaying unit displays visual representations of media data items in a temporal order according to temporal metadata of the media data items. An operation unit changes the position of the visual representation of a first media data item upon receipt of a user input. Automatically, the position of the visual representations of some other media data items are changed corresponding to the position change of the visual representation of the first media data item.

14 Claims, 7 Drawing Sheets

(51) Int. Cl.
    *G11B 27/34*     (2006.01)
    *G06F 3/0481*    (2013.01)
    *G06F 3/0486*    (2013.01)
    *G11B 27/00*     (2006.01)
    *G11B 27/30*     (2006.01)

(52) U.S. Cl.
    CPC ........ *G06F 3/04817* (2013.01); *G11B 27/002* (2013.01); *G11B 27/309* (2013.01); *G11B 27/3036* (2013.01); *G11B 27/3081* (2013.01); *G11B 27/34* (2013.01)

(56) References Cited

U.S. PATENT DOCUMENTS

| | | | |
|---|---|---|---|
| 6,487,360 | B1 | 11/2002 | Sumiyoshi et al. |
| 7,623,755 | B2 | 11/2009 | Kuspa |
| 7,769,819 | B2 | 8/2010 | Lerman et al. |
| 2002/0186958 | A1 | 12/2002 | Ikeda et al. |
| 2003/0160813 | A1 | 8/2003 | Raju |
| 2005/0091596 | A1 | 4/2005 | Anthony et al. |
| 2008/0152298 | A1 | 6/2008 | Ubillos |
| 2008/0155458 | A1 | 6/2008 | Fagans et al. |
| 2010/0104256 | A1 | 4/2010 | Tsurumi |
| 2012/0017153 | A1 | 1/2012 | Matsuda et al. |
| 2012/0042251 | A1 | 2/2012 | Rodriguez |
| 2012/0079380 | A1 | 3/2012 | Tsai et al. |
| 2012/0110509 | A1 | 5/2012 | Isozu et al. |
| 2013/0016954 | A1* | 1/2013 | Watanabe ............ G11B 27/031 386/230 |
| 2015/0046811 | A1* | 2/2015 | Higashi ............... G06F 3/04842 715/716 |

\* cited by examiner

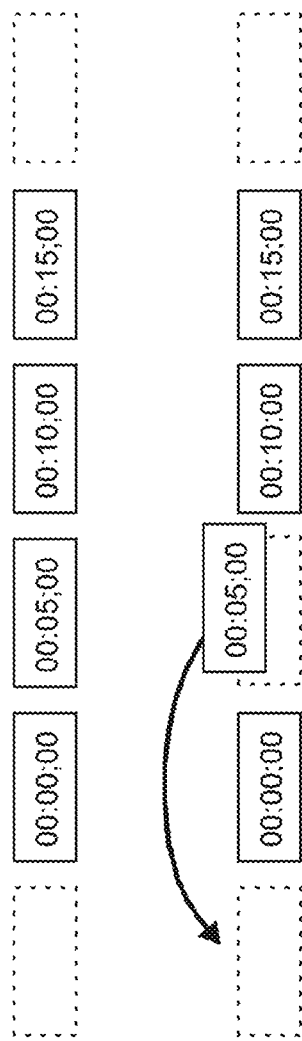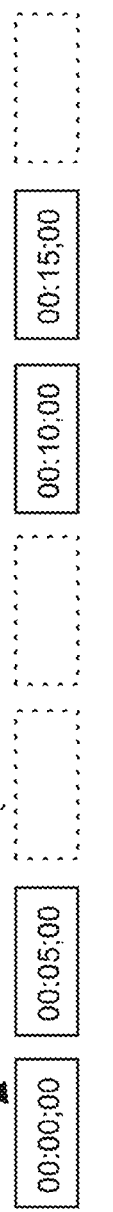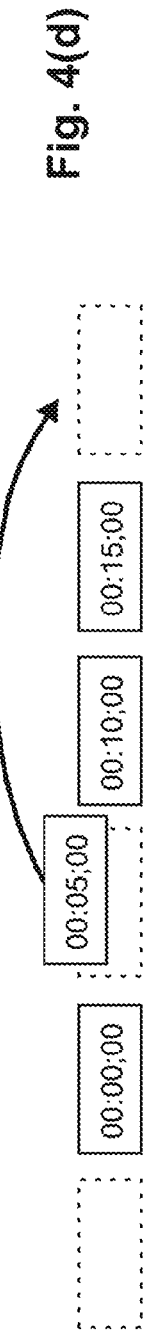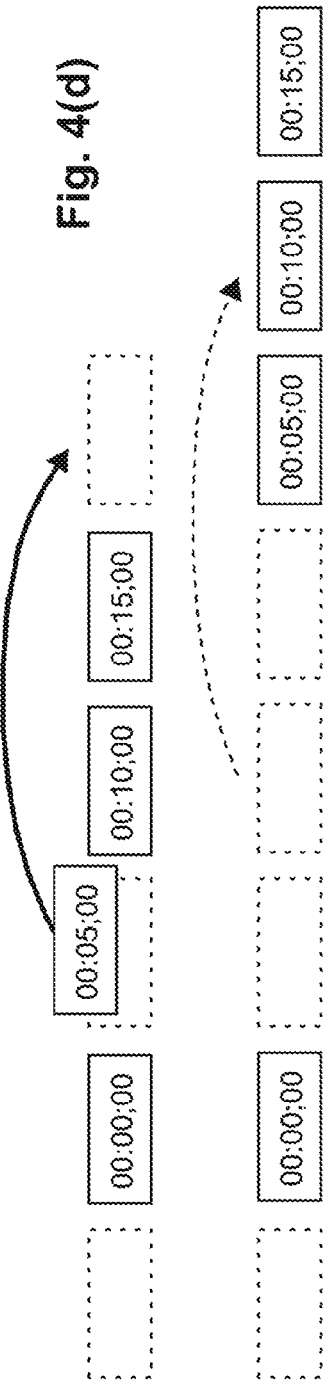

METHOD AND APPARATUS FOR REARRANGEMENT OF MEDIA DATA USING VISUAL REPRESENTATIONS OF THE SAME

RELATED APPLICATIONS

This application is a continuation application of U.S. patent application Ser. No. 14/966,519, entitled "METHOD AND APPARATUS FOR REARRANGEMENT OF MEDIA DATA USING VISUAL REPRESENTATIONS OF THE SAME", filed on Dec. 11, 2015 and which claims the benefit, under 35 U.S.C. § 119 of European Patent Application No. 14307012.6, filed Dec. 12, 2014, the contents of which is hereby incorporated in its entirety.

TECHNICAL FIELD

A method and an apparatus for rearrangement of media data are proposed, particularly utilizing visual representations of and temporal metadata associated to the same. In addition, a computer readable medium suitable for such a method and an apparatus is also proposed.

BACKGROUND

During the production of a media, such as a news video, a press report, a commercial and a film, a tremendous amount of various types of media data are generated and subsequently edited. The management of such media data is essential and crucial for the production procedure and the efficiency thereof. One common approach for the management is the utilization of metadata, which could be simply defined as data about data. A metadata item describes individual information of the media data or is a collection of varied information.

Among various types of metadata, temporal metadata, which describes the temporal features of media data, is an important one and is often used. In the case of a video data, the temporal segmentation metadata that clarifies the structure of a video is especially useful for the management and arrangement of the video. The temporal segmentation metadata can usually be acquired by detection of shot boundaries in a video, which can be accomplished by various known techniques in the field. A shot boundary is a cut or a fade in the video and defines a shot between two shot boundaries. Several shots located at a same set can be grouped together and become a scene of a video. The structure of a video is generally described by such shots and scenes.

For the detection of shot boundaries in a video, a satisfied result can be generally acquired by existing techniques. For example, shot metadata can be generated from techniques such as Edit Decision List (EDL). However, the detection of scenes in a video is usually with many errors which bring trouble and need to be corrected. In addition, there are cases where metadata about the temporal structure of the video is missing and thus has to be generated. For example, in the situations when digitizing analog video archives, when the target videos are without metadata about the temporal structure, or when the temporal metadata are lost during production.

SUMMARY

Therefore, an improved solution for rearrangement of media data is proposed, which particularly utilizes visual presentations and temporal metadata of the media data.

According to one embodiment, a method of rearrangement of media data is proposed, using visual representations and temporal metadata of the media data. The method comprises: displaying visual representations of media data items in a temporal order according to the temporal metadata of the media data; and changing the position of the visual representation of a first media data item upon receipt of a user input, wherein the position of the visual representation of at least one second media data item is automatically changed corresponding to the position change of the visual representation of the first media data item. The at least one second media data item is temporally precedent or subsequent to the first media data item.

In particular, when the position of the visual representation of the first media data item is changed backward with respect to the temporal order, the position of the visual representation of at least one second media data item, which is temporally precedent to the first media data item, is automatically changed. Similarly, when the position of the visual representation of the first media data item is changed forward with respect to the temporal order, the position of the visual representation of at least one second media data item, which is temporally subsequent to the first media data item, is automatically changed. Preferably, after the position change, the relative position between the visual representations of the first and the at least one second media data items remains the same.

In one embodiment, the method further comprises clustering the visual representations of the media data items into groups according to the temporal metadata thereof. The groups are displayed in a temporal order according to the temporal metadata of the media data items.

Accordingly, changing the position of the visual representation of the first media data item includes moving the first media data item from a first group to a second group or to an empty area to create a new group. In one embodiment, the at least one second media data item is automatically moved to the second group or the new group corresponding to the position change of the first media data item.

In one embodiment, the groups are displayed in a temporal order in a vertical direction, and in each of the groups, the visual representations of the media data items are displayed in a temporal order in a horizontal direction, or vice versa.

In one embodiment, the visual representation of a media data item includes a draggable graphical icon. The changing of the position of the visual representation of the first media data item includes dragging and dropping the graphical icon thereof upon receipt of a user input.

In one embodiment, each item of the media data is a shot of a video data, and the temporal metadata thereof is the timecode of the shot. In addition, each group of the media data items is a scene of the video.

In one embodiment, the method further comprises modifying the temporal metadata of the media data corresponding to the position change of the visual representation of the media data.

According to one embodiment, an apparatus configured to rearrange media data using visual representations of the same is introduced, which comprises a displaying unit, an input unit and an operation unit. The displaying unit is configured to display visual representations of media data items in a temporal order according to the temporal metadata of the media data. The input unit is configured to receive a user input. The operation unit is configured to change the position of the visual representation of a first media data item upon receipt of a user input, wherein the position of the visual representation of at least one second media data item is automatically changed corresponding to the position change of the visual representation of the first media data item. The at least one second media data item is temporally precedent or subsequent to the first media data item. Preferably, the apparatus further comprises a receiving unit configured to receive media data and metadata thereof and a storage unit configured to store the same.

In one embodiment, the operation unit is further configured to cluster the visual representations of the media data items into groups according to the temporal metadata thereof. The displaying unit (13) is configured to display the groups in a temporal order according to the temporal metadata of the media data items.

Also, a computer readable storage medium has stored therein instruction for rearrangement of media data using visual representations of the same, which when executed by a computer, cause the computer to: display visual representations of media data items in a temporal order according to the temporal metadata of the media data; and change the position of the visual representation of a first media data item upon receipt of a user input, wherein the position of the visual representation of at least one second media data item is automatically changed corresponding to the position change of the visual representation of the first media data item. The at least one second media data item is temporally precedent or subsequent to the first media data item.

The proposed method and the apparatus provide improved solutions for rearrangement of media data. By displaying a clear visual representation of the media data items, the structure and relations among the items can be easily read and understood by a user. In addition, the rearrangement of the structure can be performed optimally with minimal manual effort and with the help of automatic modification.

In the case where the media data are video shots, it would be easier and more efficient to reassign the shots and cluster them into scenes. The rearrangement of multiple shots into scenes can be accomplished at once by manually moving only one of the shots and automatically perform the movement of the other shots. Video scenes can be reviewed in a more thorough way and can be created, deleted and managed efficiently.

BRIEF DESCRIPTION OF THE DRAWINGS

For a better understanding the proposed solutions shall now be explained in more detail in the following description with reference to the figures. It is understood that the solutions are not limited to this disclosed exemplary embodiments and that specified features can also expediently be combined and/or modified without departing from the scope of the proposed solutions as defined in the appended claims.

FIG. 4(a) shows an initial visual representation of four video shots, displayed in a temporal order according to the timecode of the shots.

FIG. 4(b) illustrates an exemplary situation where the positions of the visual representations are changed upon receipt of a user input.

FIG. 4(c) illustrates the result of the visual representations after the positions are changed according to FIG. 4(b).

FIG. 4(d) illustrates another exemplary situation where the positions of the visual representations are changed upon receipt of a user input.

FIG. 4(e) illustrates the result of the visual representations after the positions are changed according to FIG. 4(d).

DETAILED DESCRIPTION OF PREFERRED EMBODIMENTS

Figure 1:
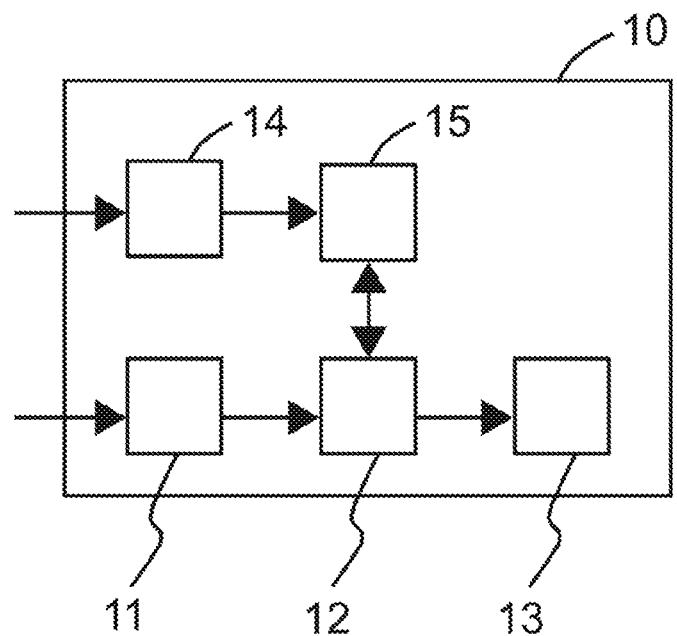
FIG. 1 is a schematic diagram illustrating a preferred embodiment of an apparatus configured to rearrange media data.

FIG. 1 schematically illustrates a preferred embodiment of an apparatus 10 configured to rearrange media data using visual representations of the same. The apparatus 10 comprises an input unit 11, an operation unit 12 and a displaying unit 13.

The displaying unit 13 is configured to display visual representations of media data items in a temporal order. Specifically, each of the media data items is respectively associated with temporal metadata, and the temporal order of the visual representations thereof is decided according to the temporal metadata.

The input unit 11 is configured to receive a user input, and can be any type of input device that is able to receive an input from a user to interact with and/or provide instructions to the apparatus 10. In alternative, an external user input device can be used and connected to the apparatus to receive a user input.

The operation unit 12 is configured to change the position of the visual representations of the media data items upon receipt of a user input. Particularly, when the position of the visual representation of a first media data item is changed by the received user input, the position of the visual representation of at least one second media data item, which is temporally precedent or subsequent to the first one, is automatically changed by the operation unit 12, corresponding to the position change of the first media data item.

Preferably, the apparatus 10 further comprises a receiving unit 14 and a storage unit 15. The receiving unit 14 is configured to receive media data and the metadata thereof from an internal or external information resource, database and/or device with respect to the apparatus 10. In other words, the receiving unit 14 can be any type of device that is appropriate to receive media data for further processing. The storage unit 15 is configured to store and archive the media data and metadata received from the receiving unit 14, and can be, for example, any type of memory device that is feasible for data storage. In alternative, the media data and metadata can also be stored in any other supplementary storage devices inside or outside of the apparatus 10. In addition, the receiving unit 14 and the storage unit 15 can be optionally combined into one device for the same functions.

Figure 2:
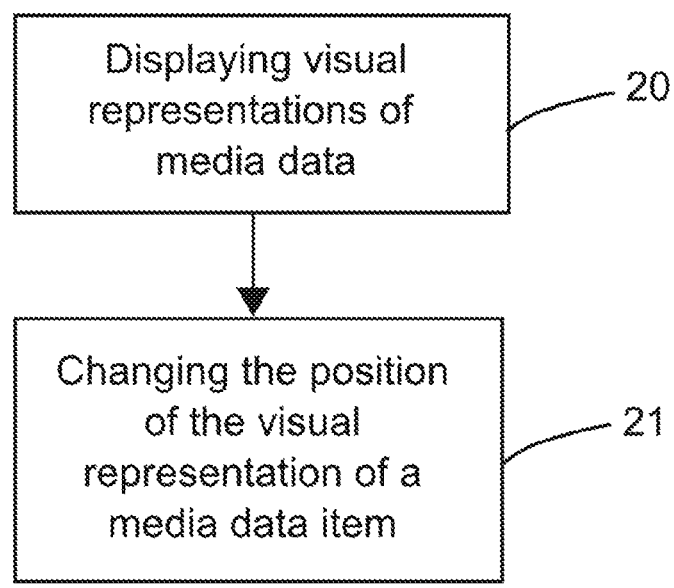
FIG. 2 is a flow chart illustrating a preferred embodiment of a method for rearrangement of media data.

FIG. 2 schematically illustrates a preferred embodiment of a method for rearrangement of media data using visual representation of the same. In general, the method comprises displaying 20 visual representations of media data items and changing 21 the position of the visual representation of a first media data item upon receipt of a user input. When the position of the first media data item is changed, the position of the visual representation of at least one second media data item, which is temporally precedent or subsequent to the first media data item, is automatically changed as well.

Referring to FIG. 1, the preferred embodiment of the method will be further explained in detail below with the exemplary embodiment of the apparatus 10. Each item of the media data can be associated with various types of metadata, preferably, with temporal metadata. As used herein, the term "media data" and "metadata" describe, for example, video data, audio data, text data, files including multimedia streams, files including digital photos, or the combination thereof.

Figure 3:
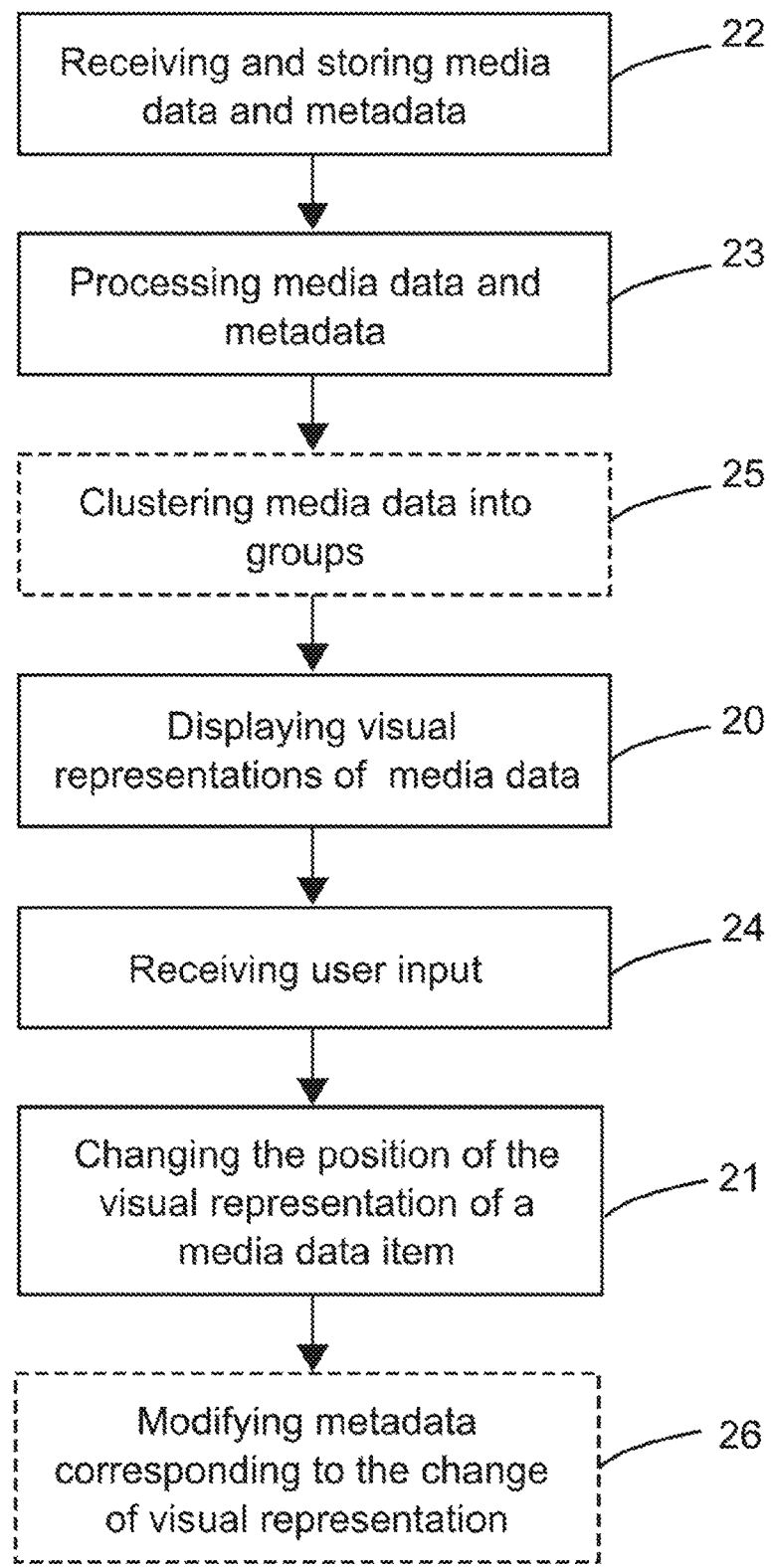
FIG. 3 is a flow chart showing more details of the preferred embodiment of the method for rearrangement of media data.

The displaying unit 13 of the apparatus 10 displays 20 visual representations of media data items. More specifically, as shown in FIG. 3, the media data is firstly received 22 by the receiving unit 14 of the apparatus 10 and stored in the storage unit 15. The metadata of the media data is preferably received and stored 22 at the same time as the media data itself. In alternative, the metadata can be acquired latter in any feasible way, e.g., be generated by the operation unit 12 from the received media data and then stored in the storage unit 15. Before being subjected to further processing, each item of the received media data is preferably associated with temporal metadata.

The media data and the metadata thereof are subsequently processed 23 by the operation unit 12, which then provides instructions to the display unit 13 to display 20 the visual representations of the media data. As described above, the display unit 13 displays 20 the visual representations of the media data in a temporal order which is decided according to the temporal metadata of the media data.

The input unit 11 of the apparatus 10 receives 24 a user input to change the position of the visual representation of a first media data item. Upon receipt of the user input, the operation unit 12 of the apparatus 10 performs the user instruction.

When the position of the visual representation of the first media data item is changed 21, an automatic change of the position of the visual representation of at least one second media data item is performed. The at least one second media data item is temporally precedent or subsequent to the first media data item according to the temporal metadata thereof.

Preferably, the relative positions of the visual representations of the first and the at least one second media data items remains the same before and after the position change of the visual representations. More specifically, the visual representations of the first and the at least one second media data item are changed in a synchronous way. While the position change of the first media data item's visual representation is triggered by a user input, the change of the visual representation of the at least one second media data item is performed automatically by the operation unit 12 substantially following the change of the first media data item.

Of course, when multiple user inputs are successively received 24 by the input unit 11, the changing 21 of the visual representations can be iterated corresponding to the individual user inputs.

FIG. 4 schematically illustrates an exemplary embodiment of the method for rearrangement of media data using the visual representations of the same. Four media data items are shown and represented by the visual representations here, and are displayed, for example, by the display unit 13 of the apparatus 10. The display unit 13 can be, for example, a computer display, a TV screen, etc., that is included in or connected to the apparatus 10. It should be understood that the amount of the media data to be displayed is not limited and is flexible depending on various demands. In this embodiment, the visual representation of each of the media data items is a graphical icon in the form of a rectangle with solid frame. Of course, any other shape or type of visual representation can also be used, such as a square, a triangle, a graphical picture, etc. The size, color and other visual features of the visual representation are flexible and selectable according to users' demand and preference. Preferably, the visual representations, i.e. the graphical icons, are draggable, for example, upon receipt of a user input and via the exemplary apparatus 10.

For the purpose of clear explanation, each of the media data item in this embodiment is assumed to be a shot of a video data. The temporal metadata of the media data is, for example, the timecode of the shot. Optionally, the timecode can also be visually presented, as shown in FIG. 4, in the form of "00:00;00" or in any other alternative form. The visual representations of the video shots can be thumbnails of the shot (not shown) providing information of the shots, or can be any other type of graphical icons.

The rectangles with dotted frames in FIG. 4 represent empty spaces which are not occupied by the visual representations of the media data. The dotted frame can be visible or invisible for a user depending on practical uses and demands.

FIG. 4(a) shows an initial visual representation of the four video shots, which are displayed in a temporal order according to the timecode of the shots. In this case, the temporal order is shown in a horizontal direction, where the temporally precedent shots are on the left. The displayed timecode of the shots can also illustrate the temporal order.

FIGS. 4(b)-(e) illustrate two exemplary situations where the positions of the visual representations are changed upon receipt of a user input. A user can use, for example, a mouse, a remote control or any type of suitable input device to provide instruction to the apparatus 10 to change the positions of the graphical icons. Preferably, the user can use the input device to drag and drop the graphical icons to a desirable position.

In FIG. 4(b), the position of the graphical icon of the shot 00:05;00 is changed backward with respect to the displayed temporal order, i.e., to the left hand side. Corresponding to this change, the position of the graphical icon of the shot 00:00;00, which is temporally precedent to the shot 00:05;00, is automatically changed. Preferably, the automatic position change of the graphical icon of the shot 00:00;00 is performed in a same way as the manual change of the shot 00:05;00 triggered by the user. In such way, as the result shown in FIG. 4(c), the relative positions of the shots 00:00;00 and 00:05;00 remains the same before and after the position change.

FIG. 4(d) shows another situation where the position of the graphical icon of the shot 00:05;00 is changed forward with respect to the displayed temporal order, i.e., to the right hand side. Accordingly, as shown in FIG. 4(e), the positions of the graphical icons of the two shots 00:10;00 and 00:15;00, which are temporally subsequent to the shot 00:05;00, are automatically changed, corresponding to the manual change of the shot 00:05;00.

FIG. 5 schematically illustrates another exemplary embodiment of the method for rearrangement of media data using the visual representations of the same. Referring to FIG. 3, in this embodiment, the method further comprises clustering 25 the visual representation of the media data items into groups according to the temporal metadata thereof. The groups are correspondingly displayed in a temporal order according to the temporal metadata as well.

Figure 5A:
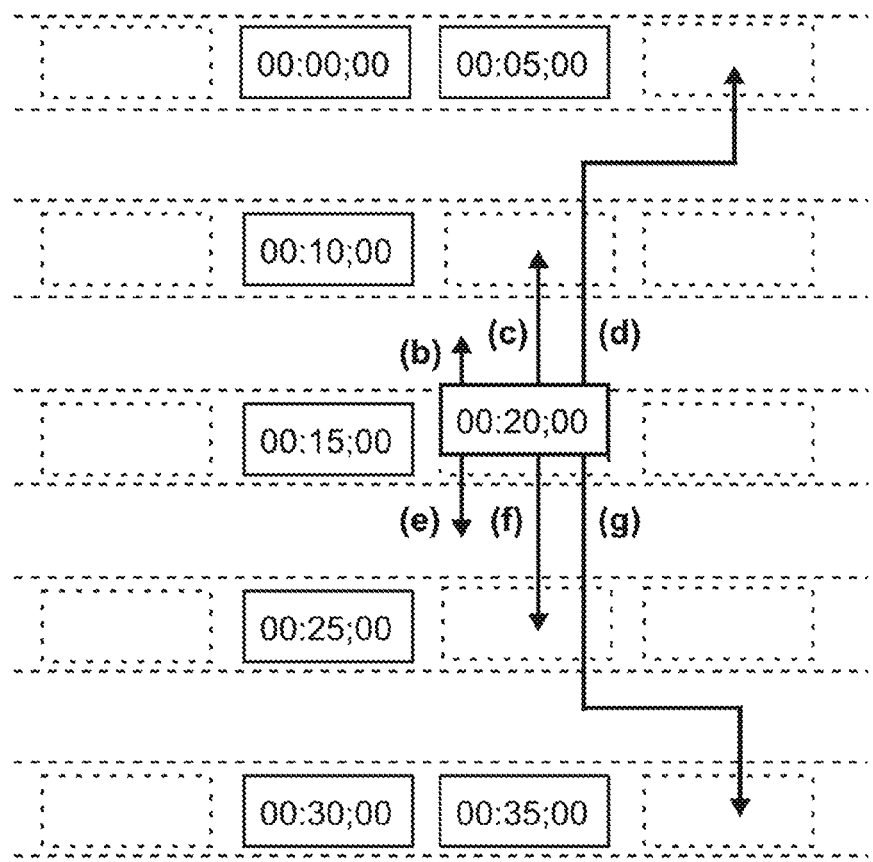
FIG. 5(a) shows an initial visual representation of eight media data items.

FIG. 5(a) shows the initial visual representation of eight media data items in this embodiment. Similar to the previous embodiment, each of the media data items is a shot of a video data, and the temporal metadata thereof is the timecode of the shot. This embodiment differs from the previous embodiment in that the visual representations are further clustered into groups and displayed in a temporal order in both horizontal and vertical directions.

As an example, the shots are clustered into groups according to their timecode, and each group is referred to as a scene in the video. The clustering of the shots and scenes can be accomplished by, for example, the operation unit 12 of the exemplary apparatus 10, using any existing techniques known in the field. The scenes are visually represented in a temporal order in the vertical direction, where the temporally precedent ones are on the top and the latter ones are at lower positions. In each of the groups, the shots are visually and temporally represented in the horizontal direction as above mentioned. Of course, the temporal order of the scenes and the shots can also be visually represented in any other ways or arrangement.

Along the vertical direction, the scenes are preferably separated by individual gaps, which are illustrated as the empty areas between the dotted lines shown in FIG. 5(a). In contrast, the shots aligned horizontally in a same scene group are preferred to be positioned following each other without significant gaps in between. Of course, the size and graphical features of the empty areas can be flexibly decided according to different situations and demands.

The position of the visual representations of the shots can be changed 21 upon receipt of a user input. Particularly, the graphical icons of the shots can be moved among the scene groups by dragging and dropping the same via a user input. In addition, the graphical icons of the shots can be dragged into an empty area to create a new scene group.

When a shot is moved to a temporally precedent scene group or empty area, i.e. the position of the graphical icon is moved upward, all the shots that are between the original and destination positions of the moved shot are automatically moved upward as well, to the destination scene group or empty area. Similarly, if the shot is moved to a temporally subsequent scene group or empty area, i.e. moved downward, all the shots between the original and destination positions of the moved shot are automatically moved downward to the destination scene group or empty area.

Preferably, following the manual and automatic changes of the position of the graphical icons of the shots, other additional automatic modifications of the visual representations are performed.

Preferably, the graphical icons of the shots in each of the re-arranged scene groups are automatically sequenced in a temporal order according to the temporal metadata, i.e. the timecode of the shots in this embodiment. In other words, a user can drag and drop the graphical icon of a chosen shot from one scene group to another, without worrying the exact position to drop the graphical icon. After the manual operation, in each of the scene groups, all the graphical icons are automatically sequenced in an optimal temporal order.

If one scene group becomes empty because all the shot icons therein are moved away, this empty scene group can be deleted automatically and not visible anymore. In addition, it is preferred that each of the scene groups is vertically separated from each other by one and only one empty area. If two or more successive empty areas result from the manual and/or automatic position change of the graphic icons, they would be combined into one empty area which has a same size and same graphical features as a single empty area. On the other hand, if two scene groups are vertically positioned relative to each other without empty area in between, an empty area would be added in the visual representation.

In other words, after the manual and/or automatic change, the graphical icons and the gaps are automatically and correspondingly modified to provide an optimal visual representation of the media data items.

FIGS. 5(b)-(g) illustrate several exemplary embodiments of the position change of the visual representation of media data according to the described embodiment of the method.

Figure 5B:
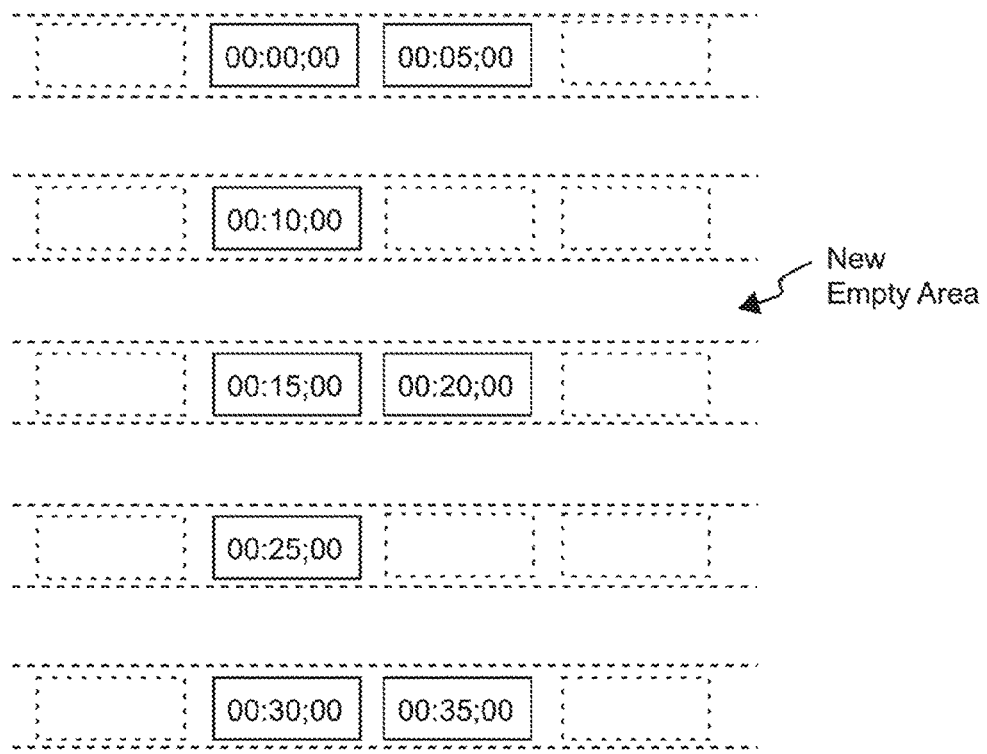
FIG. 5(b) shows the change result according to a user input (b) shown in FIG. 5(a).

FIG. 5(b) shows the change result according to a user input (b) shown in FIG. 5(a). The operation (b) moves the shot 00:20;00 to the precedent empty area.

Correspondingly, the shot 00:15;00, which is precedent to the shot 00:20;00 and is between the shot 00:20;00 and the destination empty area, are moved to the destination empty area as well. A new scene group is created at the destination empty area and includes the shots 00:15;00 and 00:20;00. In this new scene group, the shots 00:15;00 and 00:20;00 are visually displayed in a temporal order in the horizontal direction. The original scene group becomes empty and is thus deleted. The empty areas are automatically adapted by adding a new empty area between the new scene group and the scene group of "00:10;00". In the end, the visual representation looks identical to the original representation shown in FIG. 5(a).

Figure 5C:
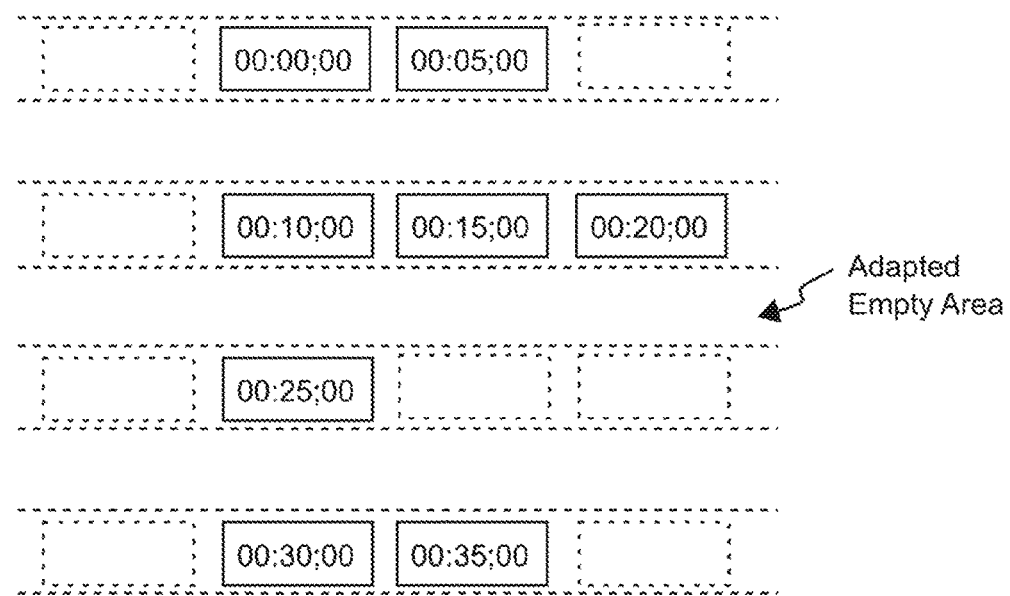
FIG. 5(c) shows the result according to the operation (c) shown in FIG. 5(a).

FIG. 5(c) shows the result according to the operation (c) shown in FIG. 5(a). The shot 00:20;00 is moved to a precedent scene group. As a result, the shot 00:15;00, which is precedent to the shot 00:20;00 and is between the shot 00:20;00 and the destination group, is moved automatically to the same scene group including the shots 00:10;00 and 00:20;00. The three shots 00:10;00, 00:15;00 and 00:20;00 are automatically sequenced and visually displayed in a temporal order in the horizontal direction. The empty scene group and the two neighboring empty areas are adapted and combined into one empty area.

Figure 5D:
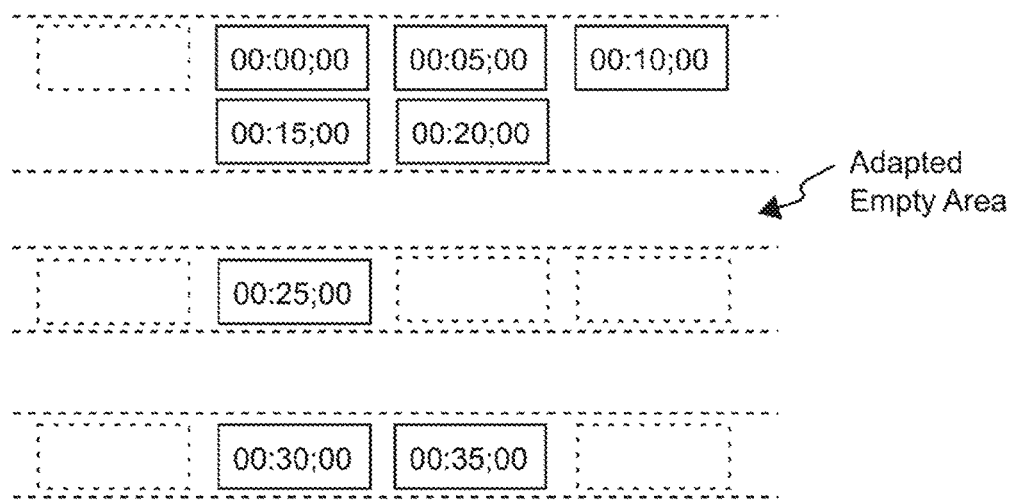
FIG. 5(d) shows the result according to the operation (d) shown in FIG. 5(a).

In FIG. 5(d), corresponding to the operation (d) shown in FIG. 5(a), the shot 00:20;00 is moved to the first scene group. According to the above described method, the two shots 00:10;00 and 00:15;00, which are between the moved shot 00:20;00 and the destination scene group, are automatically moved to the same destination group. The resulting two empty scene groups and the empty areas in between are adapted accordingly.

Figure 5E:
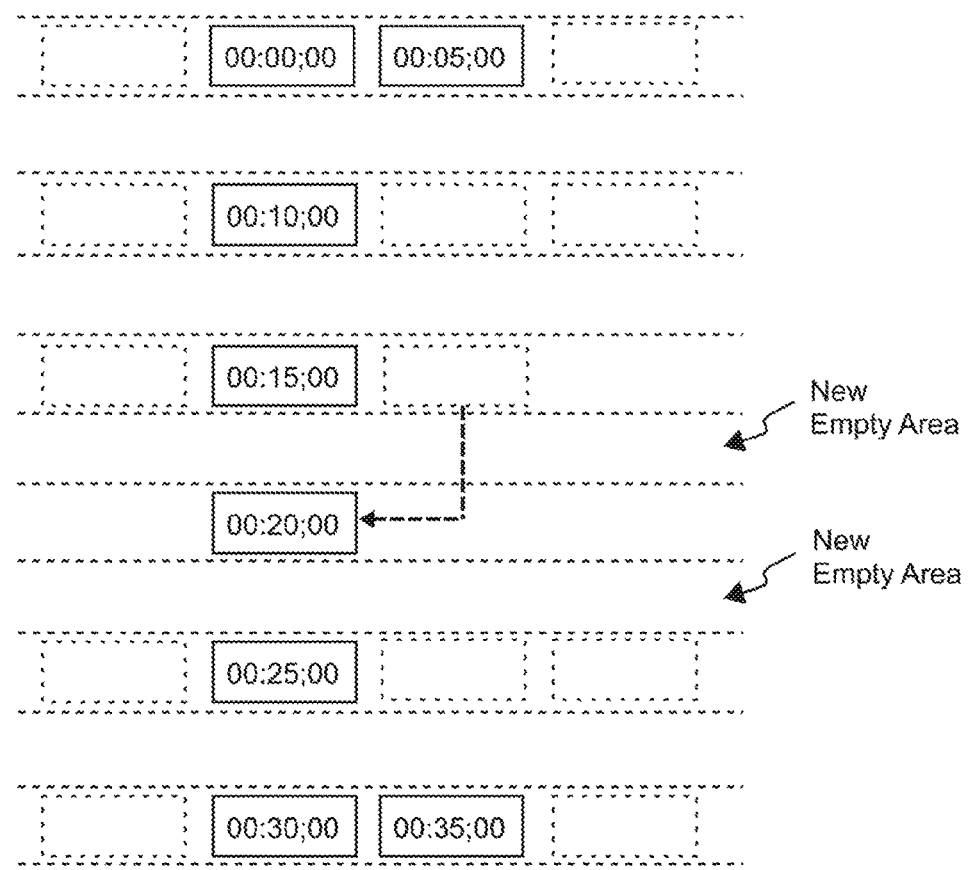
FIG. 5(e) shows the result according to the operation (e) shown in FIG. 5(a).

In FIG. 5(e) which corresponds to the operation (e) shown in FIG. 5(a), the shot 00:20;00 is moved to the subsequent empty area. A new scene group including only the shot 00:20;00 is accordingly created, and the empty areas are adapted by adding two empty areas. Although the automatic change among groups for other shots is not required here, since there is no other shots between the moved shot and the destination empty area, the positions of the subsequent scene groups are accordingly modified and changed in the vertical direction. It can be especially shown here, when the position of the shot 00:20;00 is changed forward with respect to the vertical temporal order, i.e. downward in this exemplary embodiment, the shots and the corresponding scene groups subsequent to the shot 00:20;00 are automatically changed in a similar way, i.e. forward with respect to the vertical temporal order.

Figure 5F:
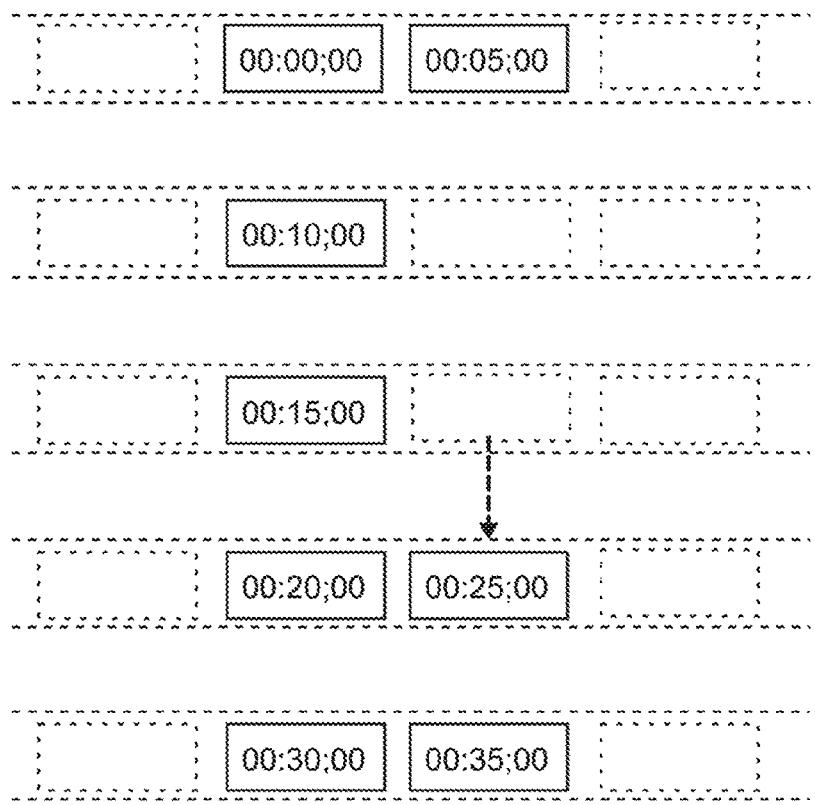
FIG. 5(f) shows the change result of the operation (f) shown in FIG. 5(a).

FIG. 5(f) shows the change result of the operation (f) shown in the FIG. 5(a). The shot 00:20;00 is moved to the subsequent scene group. The creation of a new empty area or new scene group is not required here. However, in the destination scene group including the two shots 00:20;00 and 00:25;00, the two shots are automatically sequenced and visually displayed according to a temporal order in the horizontal direction, resulting in the shot 00:20;00 is on the left while the latter shot 00:25;00 is eventually positioned on the right hand side.

Figure 5G:
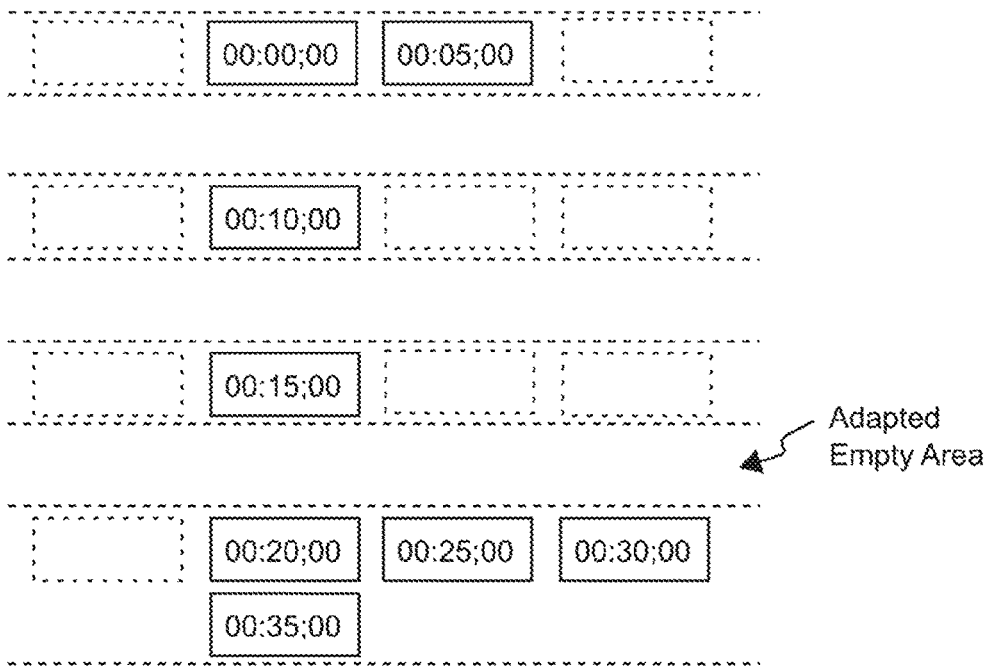
FIG. 5(g) shows the result according to the operation (g) shown in FIG. 5(a).

In FIG. 5(g), corresponding to the operation (g) shown in FIG. 5(a), the shot 00:20;00 is moved to the last scene group shown in the original visual representation. According to the above described embodiments, the shot 00:25;00 between the moved shot 00:20;00 and the destination scene group is automatically moved. In the end, the four shots 00:20;00, 00:25;00, 00:30;00 and 00:35;00 are in a same scene group and are automatically sequenced in a temporal order. Empty areas are correspondingly adapted.

Referring to FIGS. 1 and 3, one embodiment of the method for rearrangement of media data preferably further comprises modifying 26 the metadata of the media data, following the position change of the visual representation of the media data. As mentioned above in the previous embodiments, the initial visual representation of media data is generated by, for example, the operation unit 12 of the apparatus 10, using the media data and the metadata thereof received by the receiving unit 14 and stored in the storage unit 15. In other words, the initial visual representation of the media data is decided and arranged according to metadata of the media data, especially, temporal metadata in the exemplary embodiments.

The embodiments of the method provide an easy and efficient way to visually review and rearrange the temporal structure of the media data. It is preferred that, after the change of the visual representation of the media data, the corresponding metadata of the media data is modified in a similar way automatically, for example, by the operation unit 12. The modified metadata can be recorded and stored in the storage unit 15 of the exemplary apparatus 10, either replacing the original metadata or saved as a new metadata.

For example, referring to FIGS. 5(a) and 5(c), the original metadata decides and results in the initial visual representation in which eight video shots are distributed into five scene groups. After the operation (c) shown in FIG. 5(a), the eight video shots are rearranged into four scenes groups as shown in FIG. 5(c). This rearrangement of the media data, i.e. the video shots here, is preferred to be recorded in the storage unit 15 and correspondingly modify the temporal metadata of the video shots. This additional modification of the metadata provides an improved solution for the rearrangement of the media data such that the visual representation and the corresponding metadata of the same can be maintained in a synchronous way.

The invention claimed is:

1. A method of rearrangement of media data using visual representations of the media data via an operation unit of an apparatus, each item of the media data, being associated with temporal metadata, the method comprising:
changing a position of the visual representation of a first media data item from a first temporal position to a second temporal position upon receipt of a user input to an input unit of the apparatus, wherein positions of visual representations of the media data items between the first and the second temporal positions are automatically changed in a same direction as a direction of position change of the visual representation of the first media data item, while positions of visual representations of media data items located opposite to the direction of position change relative to the first temporal position remain unchanged.

2. The method of claim 1, wherein, when the second temporal position is temporally precedent to the first temporal position, the position of the visual representations of the media data items between the first and the second temporal positions are changed backward with respect to the temporal order.

3. The method of claim 1, wherein, when the second temporal position is temporally subsequent to the first temporal position, the position of the visual representations of the media data items between the first and the second temporal positions are changed forward with respect to the temporal order.

4. The method of claim 1, wherein a relative position between the visual representation of the first media data item and the visual representations of the media data items automatically changed remains the same after the position change.

5. The method of claim 1, further comprising clustering the visual representations of the media data items into groups according to the temporal metadata of the media data items.

6. The method of claim 5, wherein the first temporal position of the visual representation of the first media data item is in a first group, and wherein the second temporal position of the visual representation of the first media data item is in a second group or in an empty area not belonging to any group.

7. The method of claim 1, wherein the visual representation of a media data item includes a draggable graphical icon.

8. The method of claim 7, wherein changing the position of the visual representation of the first media data item includes dragging and dropping the graphical icon of the first media data item upon receipt of a user input.

9. The method of claim 1, wherein each item of the media data is a shot of a video data and the temporal metadata of the media data item is the timecode of the shot, and wherein each group of the media data items is a scene of the video data.

10. The method of claim 1, further comprising modifying the temporal metadata of the media data items corresponding to the position change of the visual representations of the media data items.

11. An apparatus configured to rearrange media data using visual representations of the media data, each item of the media data being associated with temporal metadata, the apparatus comprising:
an input unit configured to receive a user input; and
an operation unit configured to change a position of the visual representation of a first media data item from a first temporal position to a second temporal position upon receipt of a user input, wherein positions of visual representations of the media data items between the first and the second temporal positions are automatically changed in a same direction as a direction of position change of the visual representation of the first media data item, while positions of visual representations of media data items located opposite to the direction of position change relative to the first temporal position remain unchanged.

12. The apparatus of claim 11, wherein the operation unit is further configured to cluster the visual representations of the media data items into groups according to the temporal metadata of the media data items.

13. The apparatus of claim 11, wherein the apparatus further comprises a receiving unit configured to receive media data and temporal metadata of the media data, and a storage unit configured to store the media data and the temporal metadata.

14. A non-transitory computer readable storage medium having stored therein instruction for rearrangement of media data using visual representations of the media data, which when executed by a computer, cause the computer to:
  change the position of the visual representation of a first media data item from a first temporal position to a second temporal position upon receipt of a user input, wherein positions of visual representations of the media data items between the first and the second temporal positions are automatically changed in a same direction as a direction of position change of the visual representation of the first media data item, while positions of visual representations of media data items located opposite to the direction of position change relative to the first temporal position remain unchanged.

* * * * *